United States Patent
Gudlavenkatasiva et al.

(10) Patent No.: US 8,271,434 B2
(45) Date of Patent: Sep. 18, 2012

(54) CENTRAL DATA STORE PROCESS CONFIGURATION

(75) Inventors: Bhaskar R. Gudlavenkatasiva, Tampa, FL (US); Sutap Chatterjee, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 310 days.

(21) Appl. No.: 12/571,857

(22) Filed: Oct. 1, 2009

(65) Prior Publication Data

US 2011/0082831 A1 Apr. 7, 2011

(51) Int. Cl.
*G06F 13/30* (2006.01)
(52) U.S. Cl. .......... 707/610; 709/208; 709/221
(58) Field of Classification Search .......... 707/610; 709/208, 221
See application file for complete search history.

(56) References Cited

U.S. PATENT DOCUMENTS

| | | | | |
|---|---|---|---|---|
| 6,295,541 | B1 * | 9/2001 | Bodnar et al. | 1/1 |
| 6,671,695 | B2 * | 12/2003 | McFadden | 707/656 |
| 6,725,262 | B1 * | 4/2004 | Choquier et al. | 709/221 |
| 7,076,567 | B1 * | 7/2006 | Chasman et al. | 709/248 |
| 7,403,946 | B1 * | 7/2008 | Taylor | 707/612 |
| 7,451,163 | B2 * | 11/2008 | Selman et al. | 1/1 |
| 2006/0271600 | A1 * | 11/2006 | Goh et al. | 707/201 |

* cited by examiner

*Primary Examiner* — Fred I Ehichioya
*Assistant Examiner* — Michelle Owyang (57) ABSTRACT

Exemplary information systems and methods for storing information in a central data store are disclosed. An exemplary method may include providing a central data store including data for use in a plurality of environments, with the central data store selectively transmitting a portion of the data to a synchronized application associated with at least one of the environments. The method further includes establishing configurable instructions included in the central data store defining at least one synchronization parameter associated with the synchronized application, and modifying at least one of the synchronization parameters via the central data store according to a communication received from the synchronized application.

25 Claims, 6 Drawing Sheets

CENTRAL DATA STORE PROCESS CONFIGURATION

BACKGROUND

Information provided to a user or a system application is often duplicated in some form to allow access to the information to other users, system applications, or a system comprising another environment. For example, where data provided in a central data store or location is shared across a number of different systems or applications, each system may replicate the data in some form locally, e.g., by periodically downloading the data from the central data store. In this way, each individual system or application is able to access the information maintained in the central data store without disrupting access to the information by other systems.

Individual systems or applications may also modify information kept at the central data store by updating the central data store according to modifications made to local versions of the data. For example, changes to data initially copied from the central data store to a local data store or application may be distributed to the central data store so that information is consistent across all applications pulling data from the central data store.

Local applications or environments often have varied requirements for information to be compatible with the application, e.g., format requirements, database schemas for the local applications, etc. Processes for updating the local applications with information must generally be carried out manually, e.g., by administrators of the applications or of a central data store, in order to provide data in a format that can be used by each of the local applications. As a result, where a central data store provides data to a large number of local applications or environments, the process of updating the many applications with current data from the central data store and also updating the central data store with new information submitted via the application can be very time consuming and labor intensive. Additionally, any changes to local applications, e.g., format of the application or methodologies for using the information, must generally be communicated to the central data store to allow the central data store to transmit data to the local applications in the proper format or location.

Accordingly, there is a need for an improved central data storage system that provides for a simplified manner of updating information in different environments.

DETAILED DESCRIPTION

Various examples of a method and a system for storing data in a central data store are disclosed. An exemplary method may include providing a central data store including data for use in a plurality of environments, with the central data store selectively transmitting a portion of the data to a synchronized application associated with at least one of the environments. The method further includes establishing configurable instructions included in the central data store defining at least one synchronization parameter associated with the synchronized application, and modifying at least one of the synchronization parameters via the central data store according to a communication received from the synchronized application.

An exemplary information system may generally include a central data store including a plurality of first data servers, where each of the first data servers includes data associated with at least one data environments. The exemplary system further includes a synchronized application that includes a second data store in selective communication with the first data store. The second data store is associated with a first one of the plurality of environments and includes a plurality of synchronized data servers, with each synchronized data server including at least a subset of the data included in the central data store. The first data store is configured to synchronize data stored in the first data store with the data of the second data store, e.g., the subset of data from the first data store. The first data store synchronizes the data according to at least one parameter defined by synchronizing instructions that are configured to be modified by the second data store via a communication received from the second data store.

The exemplary systems and methods generally provide a configurable process for synchronizing data of a central data store with one or more local applications having different environments or formats. As described further below, an environment may include any parameter or characteristic of the data in the central data store that is used in organizing or segregating data, e.g., geographical locations associated with servers supporting the data, formats of associated servers or local applications, or the like. In some examples, a platform-neutral data representation language may be employed that allows self-configuration of synchronization parameters by applications as they are added, removed, or modified within an information system, thereby eliminating a need for manual configuration processes, e.g., by an administrator of the central data store, for each individual application or instance of the central data store.

Figure 1A:
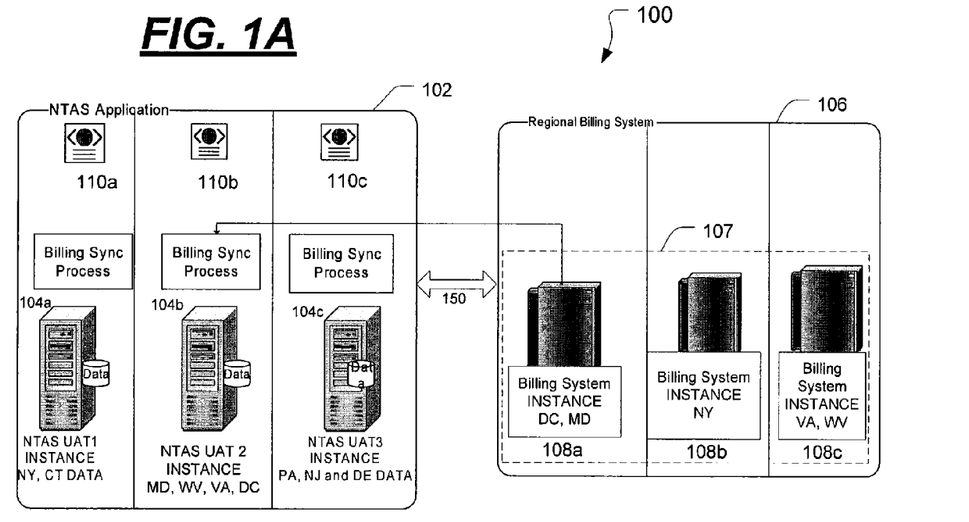
FIG. 1A illustrates an exemplary architecture of an information system including a central data store providing information to local applications.
Figure 1B:
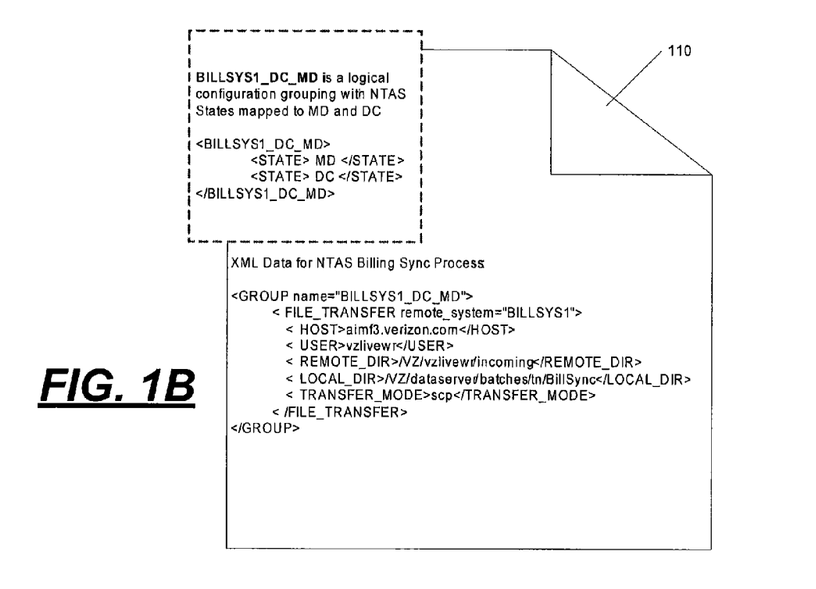
FIG. 1B illustrates an exemplary set of configuration instructions supported by the central data store shown in FIG. 1A.

Turning now to FIGS. 1A and 1B, a general architecture and operation of an exemplary information system 100 is illustrated. Information system 100 generally provides a central data store or repository for use by one or more applications that update or synchronize data, e.g., a portion of the data within the central data store. In some cases the information system 100 may supply data to a very large number of applications. For example, the information system 100 may be a national telephone number and address information directory (NTAS) that stores data for all telephone numbers offered by a telephone service provider, and data associated with each of the telephone numbers that is used by the service provider across a variety of applications, e.g., addresses associated with the telephone numbers, phone or wireless call activity logs, user information, etc. A service provider may use the information system 100 to maintain a centralized data store of telephone numbers for use by specific local applications such as billing systems, production systems, switching applications, or local service management systems, merely as examples, while minimizing the need to reproduce the data many times over for the various local applications.

The information system 100 may generally include a central data store 102 that is configured to maintain a centralized information database. The central data store 102 may include one or more servers 104a, 104, 104c (collectively, 104) that store data. While the servers 104 are shown as separate machines in the central data store 102, the servers 104 need not be physically distinct from one another. Rather, the servers 104 illustrated in central data store 102 may simply be virtual representations for the purposes of illustrating a strategy for organizing data supported by the central data store 102, and the servers 104 need not be separate or distinct machines. The number of servers 104 or groups of data in the central data store 102 may be very large, for example where a large quantity of data is supported collectively by the servers 104. The association of the servers 104 within the same central data store 102 does not necessarily require that the servers 104 are kept in a single location together. In fact, the plurality of servers 104 may be distributed between a number of separate machines, or geographically across different buildings, cities, states, or even countries.

While a single iteration of the central data store 102 is illustrated in FIG. 1A, the central data store 102 may also include additional versions or instances running at a given time, e.g., to provide access to data kept in the central data store 102 to multiple external systems simultaneously. Additionally, data may be segregated within the data store 102 among the servers 104 according to at least one parameter associated with the data or an organizational strategy that is convenient for separating the data into groups, e.g., geographic groups such as states. For example, as shown in FIG. 1A, each of the servers 104 include data from groups of states that share borders with each other. Specifically, server 104a includes NTAS data for New York (NY) and Connecticut (CT), server 104b includes data for Maryland (MD), West Virginia (WV), Virginia (VA), and the District of Columbia (DC), and server 104c includes data for Pennsylvania (PA), New Jersey (NJ) and Delaware (DE). Other groupings or strategies for organizing the data amongst the servers 104 may be employed. The data included in the central data store 102 may thus be organized into groups that are easier to manage and maintain than a single large server or other hardware for the entire central data store 102.

The central data store 102 generally may have processes defined by an administrator for exchanging or updating data with external systems, e.g., a regional billing application 106. Accordingly, central data store 102 may be in communication with regional billing application 106 via any communication link 150. Communication link 150 may include any link for transmitting data including, but not limited to, a packet-switched network or the like.

The central data store 102 may employ batch processes for updating or exchanging data with other external systems, e.g., regional billing application 106. These batch processes may be defined to allow updates in both directions, i.e., such that the central data store 102 and local application may each update the other with modified or new data. Further, individual batch processes may, alternatively or in addition to other batch processes, be defined to run in a single direction such that updated information is transferred from one machine in the environment to another machine in another environment. One exemplary process in the central data store 102 that exchanges data with another environment is a NTAS Billing Sync batch process, which will be described in further detail below.

Generally, one or more local applications may rely upon the central data store 102 for centralized information or data maintained by the central data store 102. For example, as shown in FIG. 1 a regional billing application 106 is in communication with the central data store 102 to access and update data maintained by the central data store 102, such as to determine a periodic service charge associated with a given phone number. Any variety of additional applications (not shown) may be employed in conjunction with the central data store 102.

The regional billing application 106 includes a dedicated data store 107 comprising a plurality of servers 108a, 108b, 108c (collectively, 108). These servers 108 are configured to generally synchronize data from the central data store 102 and provide a local access to the synchronized data for the regional billing application 106. Accordingly, the servers 108 may periodically exchange or update data from the central data store 102, for example when changes are made to the data stored on the servers 108 via the billing application, or when updates are made via an application other than the regional billing application 106. The regional billing application 106 may thus permit updates to data in either direction when an update is made to the data or a batch process is initiated. In other words, the regional billing application 106 may send updated data to the central data store 102, and the central data store 102 may send updated data to the regional billing application 106.

The servers 108 may generally be configured to maintain data in a format that is specific to the local application associated with the servers, i.e., regional billing application 106. For example, data may be segregated according to at least one parameter, e.g., a geographical parameter such as a state, or any other parameter(s) that is convenient. The segregation of the data within the regional billing application 106 may be according to a same parameter that is used for the segregation of data within the central data store 102. The servers 108 associated with a local application may rely on the entire data set maintained by the central data store 102, or may alternatively utilize a portion of the data set, e.g., data associated with a portion of the parameters or environments included in the central data store 102. The regional billing application 106 may thus employ a different segregation of data across the servers 108 even when employing a segregation strategy according to a same parameter or environment as the central data store 102. In some cases, groupings of the parameters associated with each server 104 in the central data store 102 are not repeated in any of the servers 108 employed within the regional billing application 106. For example, while data associated with New York and Connecticut is supported by a single server 104a in central data store 102, the data for New York is maintained on a single server 108b within regional billing application 106. Furthermore, the Connecticut data is not supported within the regional billing application 106, as the regional billing application 106 only includes data for the District of Columbia, Maryland, New York, Virginia, and West Virginia.

During synchronization of data included in central data store 102 with an application such as regional billing application 106, data may be exchanged between the central data store 102 and regional billing application 106 in any manner that is convenient. For example, regional billing application 106 may send a communication or request to the central data store 102 requesting a list of telephone numbers that became active on a given day. In response to this communication from the regional billing application 106, central data store 102 may transmit data relevant to the request, e.g., in the form of a pipe delimited file using secure file transfer protocol (sFTP). Data synchronizations may also be initiated by the central data store 102, e.g., once per day to ensure regional billing application 106 maintains relatively current data.

The central data store 102, regional billing application 106, servers 104, 108 and other components of the information system 100 utilized for storing, exchanging, updating, or creating data associated with the information system 100 may include any one of a number of known computing devices, including, without limitation, a computer workstation, a desktop, notebook, laptop, or handheld computer, or some other computing device known to those skilled in the art. Computing devices such as the foregoing may employ any of a number of known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices in various embodiments such as central data store 102, regional billing application 106, or servers 104, 108 may each include instructions executable by one or more computing devices such as those listed above. Such instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any tangible medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, as described hereinafter, or any other medium from which a computer can read.

Configuration instructions 110 may be given in a platform-neutral format that may generally be universally understood by an applicable computing device within system 100, e.g., servers 108 of regional billing application 106. In one example, extensible markup language (XML) is used. The configuration instructions 110 may generally provide a platform for local applications such as the regional billing application 106 to provide information to central data store 102 indicating parameters for synchronizing, updating, or otherwise exchanging data with the local application. Exemplary configuration instructions 110a, 110b, 110c (collectively, 110) for exchanging data between the central data store 102 and local applications, e.g., regional billing application 106, as best seen in FIG. 1B, are provided to generally define characteristics of the local applications relevant to the storage and updating of data associated with the information system 100. For example, the configuration instructions 110 may include specific parameters such as addresses or locations of servers 108, formats for storing data associated with a particular server 108, etc. The regional billing application 106 may thus communicate synchronization parameters to the central data store 102, or even be provided with information regarding the central data store 102 itself, e.g., parameters for communicating with the central data store 102, updating the configuration instructions 110, etc.

More specifically, as shown in FIG. 1B, an NTAS synchronization process associated with the regional billing application 106 (i.e., "NTAS Billing Sync Process") is defined, including the following parameters:

a destination server internet protocol address ("HOST" defined as "aimf3.verizon.com");
  user identification ("USER" defined as "vzlivewr");
  a directory in server 108 for receiving data from central data store 102 ("REMOTE_DIR"); and
  a preferred data transfer mode ("scp").

The defined parameters in the configuration instructions 110 are merely examples, and any other information regarding the servers 108 and/or the local application associated with the servers 108 that is helpful in facilitating synchronization of data with central data store 102 may be added to the configuration instructions 110.

Additionally, the configuration instructions 110 may indicate groupings of parameters or environments associated with local applications, e.g., the states including the District of Columbia and Maryland (i.e., "STATE" defined as "MD" and "DC" for "BILLSYS1_DC_MD"). Accordingly, the configuration instructions 110 will indicate that the information described above, e.g., destination server mapping, should be applied anytime a batch process is run to synchronize data relevant to the regional billing application 106 for data relevant to phone numbers in Maryland or the District of Columbia. Other characteristics of servers relevant to a given group of parameters (e.g., states) may also be included in the configuration instructions 110, such as formats used for data storage within a particular server 108, a listing of column headings included in a given data set stored on a particular server 108, or any other information that is convenient.

In one example, an NTAS batch process associated with the regional billing application 106 may include mappings for each of the servers 108 defined in XML instructions. Accordingly, when an NTAS billing synchronization batch process is initiated by one of the servers 104, the server 104 may determine which server(s) 108 support the relevant portion of data included in the central data store 102. For example, where server 104a initiates a batch synchronization process for telephone listing data associated with New York, the server 104a may read configuration instructions 110 to determine which server 108 supports data for a desired parameter or environment associated with the local application, i.e., New York. The server 104a may thus read the specific section of the configuration instructions 110 relevant to the given parameter, here "New York," and obtain information or parameters describing how any data relevant to the "New York" data should be synchronized with the server 108b, e.g., destination server mappings, location or address data, or the like.

The central data store 102 may thus be provided with information describing how to synchronize data with various local applications without requiring a manual construction of each individual synchronization process. The servers 104 may generally employ a translation process that translates data maintained within central data store 102 to a format compatible with regional billing application 106 and/or server 108. The translation process may include rules for mapping data associated with the central data store 102 into a model or schema established by the local applications such as regional billing application 106. As each local application relying upon the central data store 102 may present a unique data model, an associated translation process is generally customized to normalize each set of data associated with central data store 102 according to a configuration of the local applications as defined by the configuration instructions 110.

As stated above, the configuration instructions 110 may advantageously be platform-neutral or "context-free" such that the instructions 110 may be modified or otherwise written to by any other machine synchronizing or accessing data in the central data store 102. Accordingly, any context-free grammar format for configuration instructions 110 may be employed. For example, as described above the configuration instructions 110 illustrated in FIG. 1B include XML instructions. The provision of configuration instructions 110 in a generally universally recognized format, e.g., XML, allows the instructions 110, including file transfer protocol details, mappings to various destination servers 104, 108, to be automatically configurable by central data store 102 and/or each local application as they are added to the information system 100 or modified. For example, any local application added on to information system 100 and placed in communication with central data store 102 that is not initially included in the configuration instructions 110 may synchronize data or portions thereof from the central data store 102 with hardware associated with the local application, e.g., servers, by adding instructions relevant to the newly added application to the configuration instructions 110.

Figure 2A:
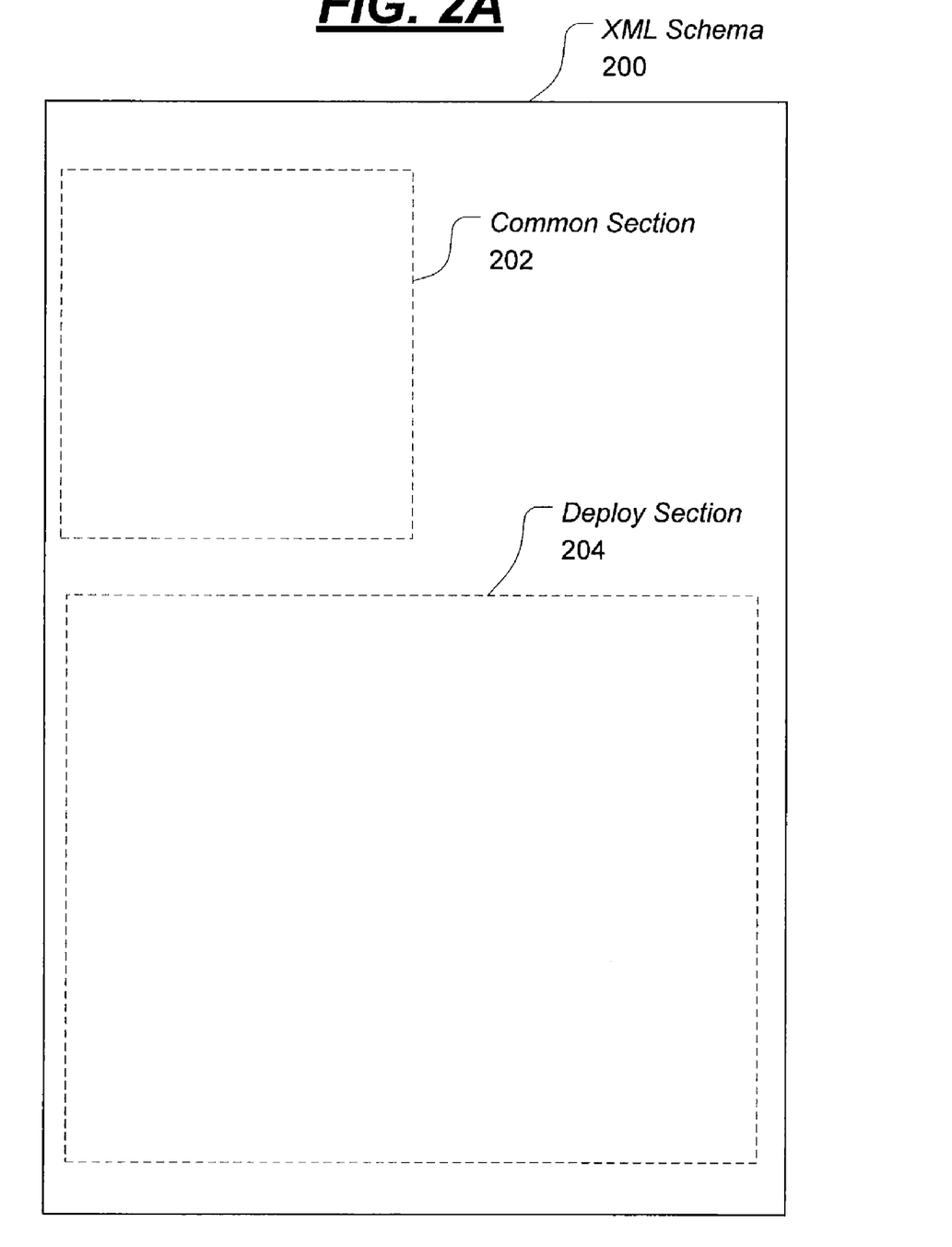
FIG. 2A illustrates a layout for an exemplary database schema associated with the central data store.
Figure 2B:
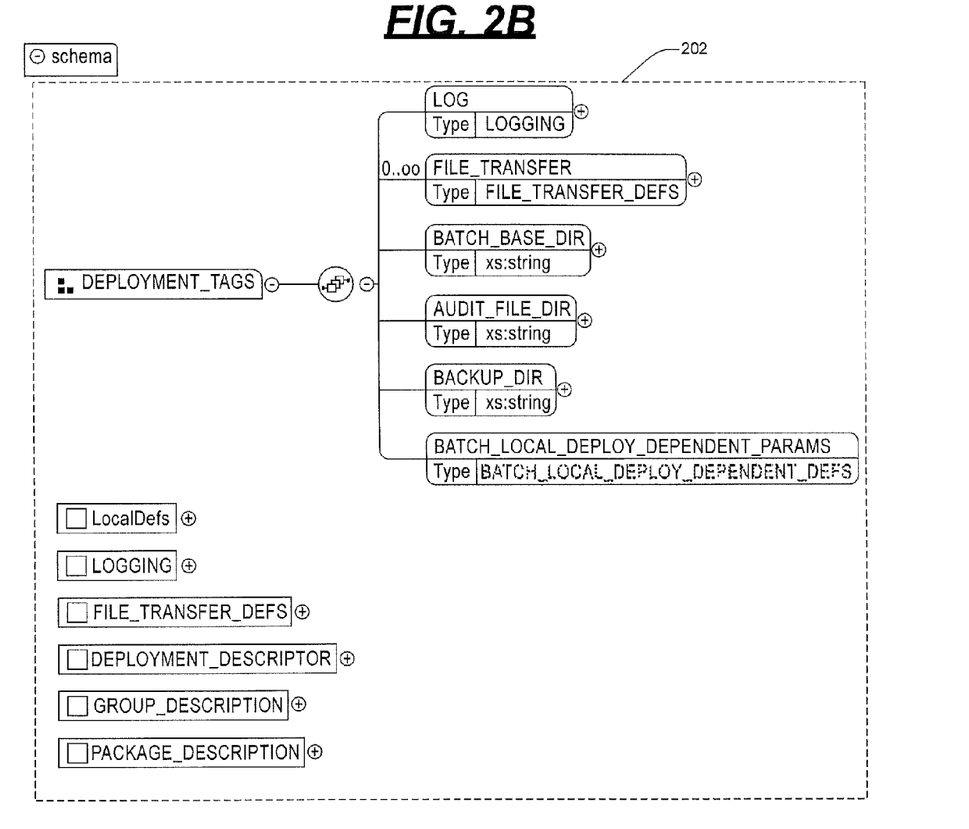
FIG. 2B illustrates a portion of the exemplary database schema of FIG. 2A.
Figure 2C:
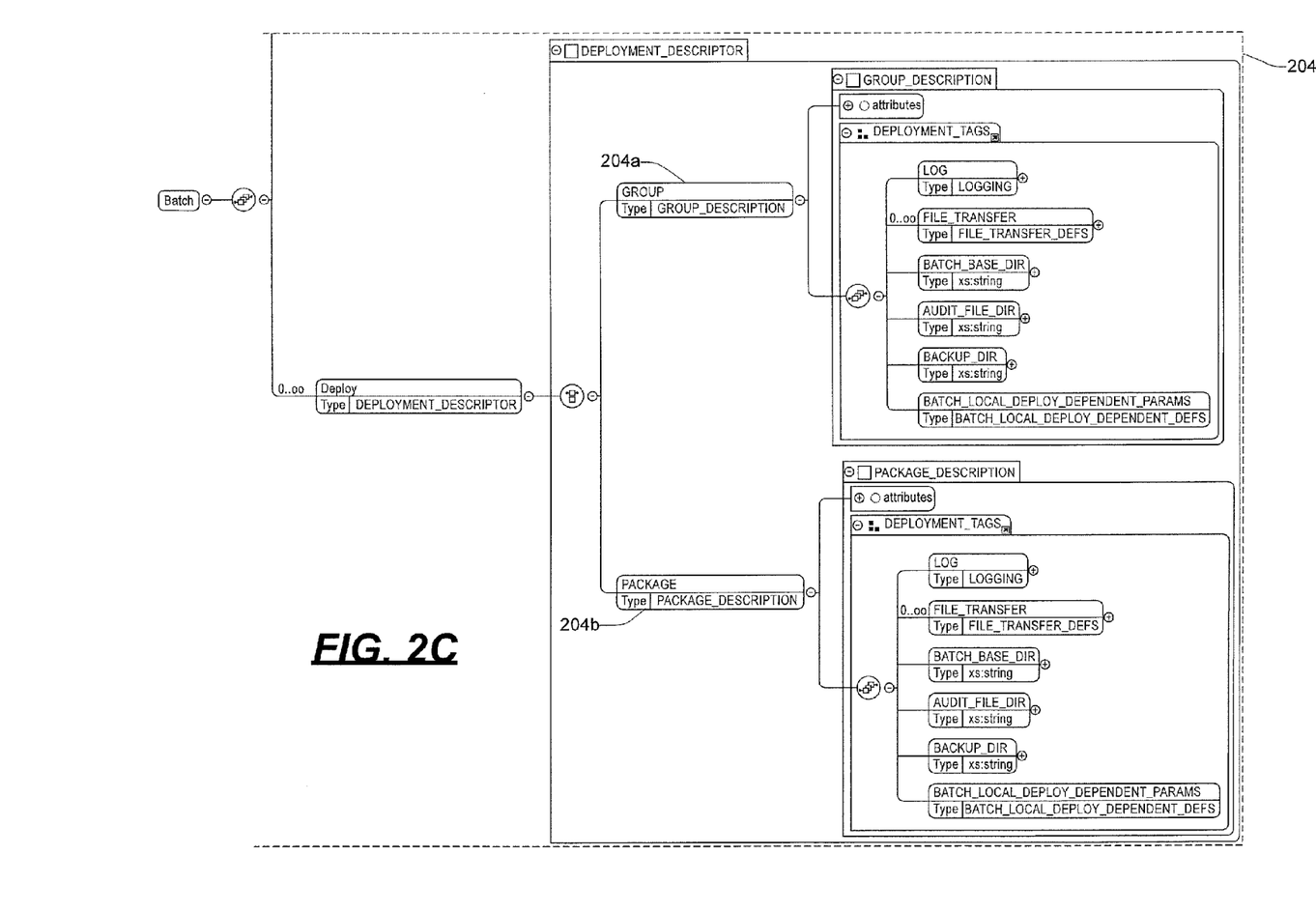
FIG. 2C illustrates a portion of the exemplary database schema of FIG. 2A.

Turning now to FIGS. 2A, 2B, and 2C, an exemplary XML schema 200 is illustrated that may be used by any local application, e.g., regional billing application 106, to interpret, modify, or add to configuration instructions 110. An XML schema may generally:
- define elements that can appear in configuration instructions 110;
- define attributes that can appear in the configuration instructions 110;
- define which elements are child elements;
- define an order of child elements;
- define a number of child elements;
- define whether an element is empty or can include text;
- define data types for elements and attributes; and
- defines default and fixed values for elements and attributes.

The XML schema 200 thus generally defines tags used in the configuration instructions 110, such that any local application may add parameters for batch processes synchronizing data between central data store 102 and the local application 104.

The exemplary XML schema 200 shown includes two general configuration sections, specifically a Common Section 202 and a Deploy Section 204. The Common Section 202, as shown in FIG. 2B, includes non-application specific instructions for configuring a batch process, e.g., a metadata configuration for a given batch process run by the central data store 102. The Common Section 202 may thus define parameters relevant to the central data store 102. The Common Section 202 thus refers to information regarding synchronization parameters associated with the information system 100 that are independent of a particular environment or local application such as regional billing application 106, and therefore these parameters may be the same for a given batch process that is run by central data store 102 for different environments or applications. The Deploy Section 204, by contrast, generally provides environment-specific configurations for a given batch process, i.e., for the local applications. For example, the Deploy Section 204 may include configuration data for server 108a for transferring data using a secure file transfer protocol for any request relevant to the application associated with the specific server 108a.

The Deploy Section 204 may generally include three distinct levels or definitions of configuration instructions for the local applications or servers 108, or groups thereof. First, a GROUP level 204a is included that defines a set of parameters or configurations for applications or environments that are grouped together, e.g., for the group of states associated with server 104a, which are New York and Connecticut. For example, in some cases a synchronization batch process in a given server 104 might communicate or exchange data with a single external server 108, e.g., where each environment associated with the server 104 is also associated with the single server 108. Accordingly, a group based configuration may be defined for the server 104, as the server 108 will be the same for each environment associated with the server 104.

The Deploy Section 204 also includes an individual or PACKAGE level 204b for batch processes that have a specific configuration based on an associated application or environment. The individual definitions may define exceptions to GROUP level definitions that are defined. For example, a batch process of the central data store 102 might use a group configuration from the GROUP level 204a for all environments associated with a given application, e.g., all states covered by regional billing application 106, with a single exception where the application sends data to a different server than is defined for the group.

A third level may be defined in the Deploy Section 204 that provides a default configuration to be applied when no other definition is provided. Specifically, a DEFAULT option (not specifically shown in FIG. 2) may be included within the PACKAGE level that includes default settings. A batch process of the central data store 102 may apply this DEFAULT definition, for example, when the central data store 102 exchanges data with a server that includes data parameters not specifically defined within the configuration instructions 110. For example, configuration instructions 110 may not have a GROUP or PACKAGE level detail relevant to certain states associated with a local application.

Any parameter associated with synchronization processes, e.g., batch processes, run by the central data store 102 may be provided within the configuration instructions 110 using the schema 200. As an example, some batch processes associated with a data synchronization process may use a parameter indicating a wait time before a batch attempts a retry operation after an unsuccessful attempt. Central data store 102 may use a same wait time for all batch processes, regardless of which application for which the batch process is synchronizing information. Accordingly, an exemplary XML definition is provided below that provides a maximum wait time for a retry operation (i.e., "BATCH_SYN_MAX_WAIT_TIME") for all batch processes of central data store 102, as may be defined in a Common Section 202 of XML schema 200, as follows:

```
<!-- To define Common Section -->
    <xs:complexType name="LocalDefs">
        <xs:sequence>
            <xs:element minOccurs="1" name="BATCH_SYN_SLEEP_TIME" type="xs:string" />
            <xs:element minOccurs="1" name="BATCH_SYN_MAX_WAIT_TIME" type="xs:string" />
            <xs:element minOccurs="1" name="RESTRICTED_STATES" type="xs:string" />
            <xs:element minOccurs="0" name="VALID_STATES" type="xs:string" />
        </xs:sequence>
    </xs:complexType>
```

Alternatively, if it is desired to define different wait time parameters for each different application or environment associated with the central data store 102, the above parameters may be defined in the Deploy Section 204 for one or more specific local applications or groups thereof.

One example of a parameter that may be provided under the Deploy Section 204 is a file transfer definition (i.e., "FILE_TRANSFER_DEFS" below) that defines what configuration information is required for a given local application, e.g., regional billing application 106, in order to synchronize files from the central data store 102 with the local application. Configuration details for this parameter may tend to be specific to a particular application or group of applications. For instance, applications requiring greater security may prefer to synchronize data using a secure file transfer protocol (ftp) process, while applications that are not as security-intensive may employ a plain ftp method. To allow applications to select these different options, a "TRANSFER_MODE" definition may be placed under the "FILE_TRANSFER_DEFS" section of the Deploy Section 204 of XML schema 200, thereby allowing regional billing application 106 to define the desired file transfer mode. An exemplary file transfer definition (i.e., "FILE_TRANSFER_ DEFS") is shown below that specifies available transfer modes (i.e., "TRANSFER_MODE") as secure ftp ("sftp"), secure copy ("scp"), network data mover ("ndm") or plain ftp ("ftp"):

```
<!-- Only this part is batch specific -->
    <xs:group name="DEPLOYMENT_TAGS">
        <xs:sequence>
            <xs:element minOccurs="0" maxOccurs="1" name="LOG" type="LOGGING" />
            <xs:element minOccurs="0" maxOccurs="unbounded" name="FILE_TRANSFER" type="FILE_TRANSFER_DEFS" />
            <xs:element minOccurs="0" maxOccurs="1" name="BATCH_BASE_DIR" type="xs:string" />
            <xs:element minOccurs="0" maxOccurs="1" name="AUDIT_FILE_DIR" type="xs:string" />
            <xs:element minOccurs="0" maxOccurs="1" name="BACKUP_DIR" type="xs:string" />
            <xs:element minOccurs="0" maxOccurs="1" name="BATCH_USER_LOGIN_ID" type="xs:string" />
            <xs:element minOccurs="0" maxOccurs="1" name="BATCH_LOCAL_DEPLOY_DEPENDENT_PARAMS" type="BATCH_LOCAL_DEPLOY_DEPENDENT_DEFS" />
        </xs:sequence>
    </xs:group>
<!-- To define File Transfer Details -->
    <xs:complexType name="FILE_TRANSFER_DEFS">
        <xs:sequence>
            <xs:element minOccurs="1" name="HOST" type="xs:string" />
            <xs:element minOccurs="1" name="USER" type="xs:string" />
            <xs:element minOccurs="0" name="PASSWORD" type="xs:string" />
            <xs:element minOccurs="0" name="REMOTE_DIR" type="xs:string" />
            <xs:element minOccurs="0" name="LOCAL_DIR" type="xs:string" />
            <xs:element minOccurs="1" name="TRANSFER_MODE">
                <xs:simpleType>
                    <xs:restriction base="xs:string">
                        <xs:enumeration value="sftp"/>
                        <xs:enumeration value="scp"/>
                        <xs:enumeration value="ndm"/>
                        <xs:enumeration value="ftp"/>
                        <xs:enumeration value="SFTP"/>
                        <xs:enumeration value="SCP"/>
                        <xs:enumeration value="NDM"/>
                        <xs:enumeration value="FTP"/>
                    </xs:restriction>
                </xs:simpleType>
            </xs:element>
            <xs:element minOccurs="0" name="QUOTE_SITE" type="xs:string" />
        </xs:sequence>
        <xs:attribute name="remote_system" type="xs:string" use="required" />
    </xs:complexType>
```

Figure 3A:
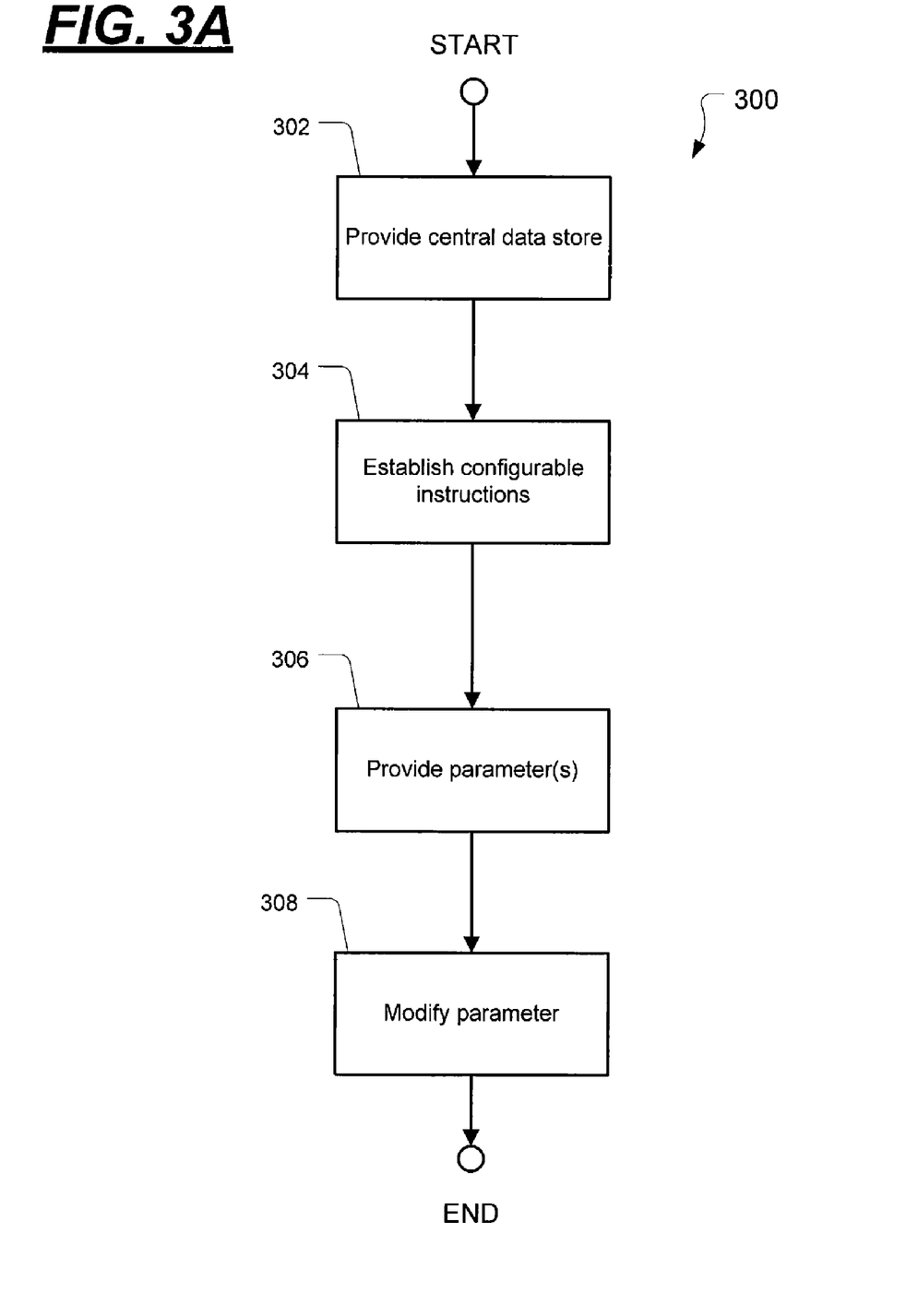
FIG. 3A illustrates an exemplary process for creating a set of configuration instructions for a local application.

Proceeding now to FIG. 3A, a process 300 for configuring instructions for a data exchange, e.g., in a batch process associated with a server 104 or 108 is described. An exemplary process 300 may run on any server, e.g., server 104, that is running a data synchronization process associated with central data store 102.

Process 300 may begin at step 302, where a central data store 102 is provided that includes data for a plurality of environments. For example, as described above a central data store 102 may be established that selectively transmits a portion of the data to a synchronized application 104 in a data synchronization process with the portion of the data being associated with at least one of the environments, e.g., a geographical location associated with the synchronized application. Process 300 may then proceed to step 304.

In step 304, configurable instructions are established in the central data store 102 that define a plurality of synchronization parameters associated with the synchronized application. For example, as described above configurable instructions 110 may be established that provide parameters used such as an address or location of servers included in the synchronized application. A wide variety of other parameters may be defined by the configurable instructions, including formats associated with a data storage structure of the synchronized application, e.g., column headings for data included in the synchronized application, or other information specific to the synchronized application enabling synchronization of the data associated with the synchronized application with that maintained in the central data store 102.

As described above, a database schema may be established for the central data store 102 that defines a layout for configurable instructions 110. For example, a schema in a generally platform-neutral format may be established, e.g., XML schema 200, that generally allows the central data store 102 to receive instructions from any local application in communication with the central data store 102. Local applications communicating with the central data store 102 may thus read the schema 200, and add parameters to the configurable instructions 110 defining data formats, server locations, or any other information required for a data synchronization process between the local application and the central data store 102.

Proceeding to step 306, at least one of the parameters is received, e.g., by central data store 102 from a local application. For example, as described above, a local application may use schema 200 to generate appropriate synchronization parameters and add them to configuration instructions 110. Process 300 may then proceed to step 308.

Proceeding to step 308, process 300 may modify at least one of the synchronization parameters via the central data store 102 based upon the environment(s) associated with the synchronized application. For example, as described above the configurable instructions 110 may define parameters associated with environments of the regional billing application 106 that is synchronizing data with the central data store 102. As described above an environment may include a geographical location associated with the local application, a function of the local application, or any other characteristic of the local application. The parameters may be modified, for example by a local application seeking to synchronize data of the central data store 102, when a local application provides parameters, e.g., by reading a schema 200 associated with the central data store 102 and adding any relevant synchronization parameters to the configurable instructions 110. Local applications may provide parameters and/or updates to the parameters by communicating with central data store 102, e.g., via communication link 150, thereby modifying or updating the configurable instructions 110 directly and without manual intervention, e.g., by an administrator of the central data store 102.

Figure 3B:
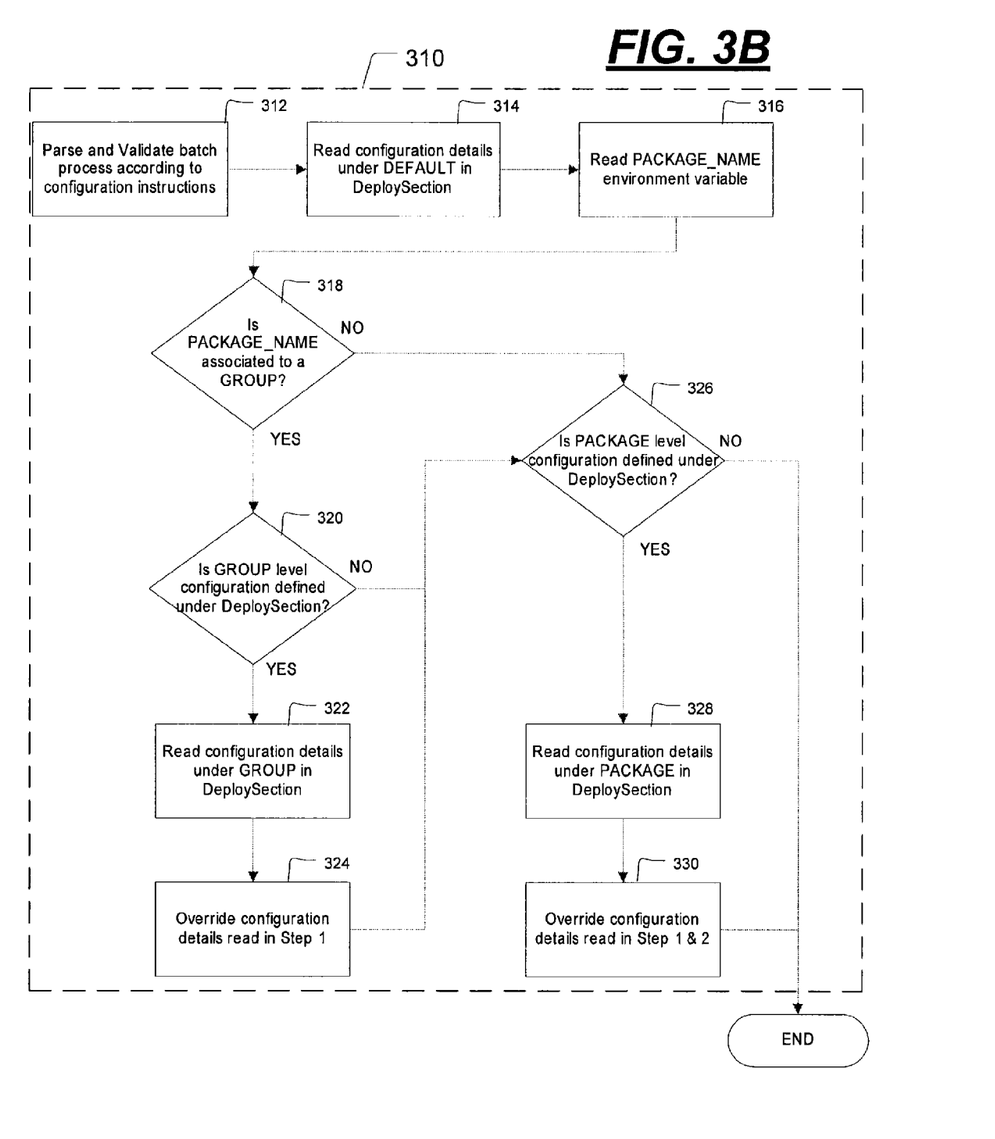
FIG. 3B illustrates an exemplary sub-process for the process shown in FIG. 3A.

Turning now to FIG. 3B, one exemplary illustration of a sub-process 310 for modifying a synchronization parameter is explained in further detail. Sub-process 310 may thus be an example of a modification step, e.g., step 308 above. Sub-process 310 begins at step 312, where central data store 102 reads configuration instructions 110 associated with a synchronization process for a given local application, e.g., regional billing application 106. For example, where configuration instructions 110 are provided in an XML format, an associated XML schema document (XSD) such as that provided above in FIG. 2 may be employed to interpret the configuration instructions 110. Sub-process 310 may then proceed to step 314.

In step 314, process 300 establishes a default definition for a plurality of parameters associated with a data synchronization process, e.g., a synchronization process where regional billing application 106 synchronizes data relevant to a given environment with the data in central data store 102. For example, as described above a DEFAULT level of schema 200 may be read by a server 104.

Proceeding to step 316, the central data store 102 reads an environment-specific parameter, e.g., a "PACKAGE_NAME" parameter defined by schema 200 that indicates a unique identifier for each environment associated with the central data store 102. For example, the PACKAGE_NAME of server 104a, NTASCP01PRD, indicates that it is a NTAS production environment for a production catalog ("CP01PRD"). A catalog may define a group of environments, e.g., states, that are stored in one database. The "NTAS CP01" catalog, as shown in FIG. 1A, has telephone number and address data relevant to the states of Maryland, Virginia, West Virginia, and the District of Columbia.

The central data store 102 may also read non-environment specific configuration details, e.g., from a Common Section 202 of configuration instructions 110. Non-environment specific configuration details may include details that are local to a batch process and not dependent on an environment associated with the local application, e.g., regional billing application 106.

Proceeding to step 318, central data store 102 queries whether a group configuration is associated with parameters of the synchronization process, e.g., an environment of regional billing application 106. For example, a server 104 running a batch synchronization process may read a GROUP name included in the configuration instructions 110 associated to the "PACKAGE_NAME" label. For example, the NTASCP01PRD label of a server 104 included in central data store 102 can be grouped under NTASPROD, MDVAWVD-CPROD, or any other group definition that is convenient. If a GROUP name is given for the PACKAGE_NAME label, subprocess 310 proceeds to step 320.

In step 320, subprocess 310 queries whether parameters have been defined for the GROUP name determined in step 318. Where parameters are defined in the configuration instructions 110, subprocess 310 proceeds to step 322, where the central data store 102 will parse the XML configuration defined for the "GROUP" under the Deploy Section of the configuration instructions 110. Proceeding to step 324, the configuration parameters read in step 322 will override parameters read in under the default configuration, i.e., from step 314, wherever there is a conflict or different values provided for a same parameter. For example, if step 314 indicates that a default file naming convention for a batch process is "FILE_NAME.DDMMYYYY," certain environments may employ a different file naming convention, e.g., "FILE_NA-ME.DDMMYYYY.xxxxxx," where "xxxxxx" is replaced with text indicating an environment associated with the file. Therefore, in step 324 the file naming convention read under the default definition from step 314 will be overridden with the value obtained from the GROUP definition from step 322.

If no group definition is defined in the configuration instructions 110, subprocess 310 proceeds from step 320 to step 326.

In step 326, subprocess 310 queries whether a specific or "package" definition is provided, e.g., under the Deploy Section 204 of schema 200. Where a PACKAGE definition is provided, subprocess 310 proceeds to step 328, where the central data store 102 parses the XML file to read the specific "PACKAGE" section of the Deploy Section 204 provided in schema 200. Proceeding to step 328, configuration parameters read in the PACKAGE level will override any previous configuration values, e.g., in step 314 or step 322. Accordingly, if a batch process needs a specific configuration which is very unique to its particular environment and does not want to employ a GROUP level configuration common with other applications, then a specific configuration can be entered under the PACKAGE section of the DeploySection of schema 200.

If a PACKAGE definition is not provided, then the default definition or group definition is maintained, and subprocess 310 and process 300 may then terminate.

Reference in the specification to "one example," "an example," "one embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A method, comprising:
    providing a central data store including data for use in a plurality of environments, the central data store selectively transmitting a portion of the data to a synchronized application in a data synchronization process, the synchronized application associated with at least one of the environments;
    establishing configurable instructions included in the central data store defining at least one synchronization parameter associated with the synchronized application;
    establishing a default definition for the at least one synchronization parameter of the data synchronization process;
    determining whether the synchronized application is associated with a group definition included in the configurable instructions, the group definition including parameters for a group of synchronized applications associated with the central data store;
    modifying, in response to the synchronized application being associated with a group definition, at least one of the synchronization parameters by applying the group definition to the at least one synchronization parameter of the data synchronization process via the central data store according to a communication received from the synchronized application, wherein the communication includes updated data received from a regional application distinct from said central data store;
    determining whether the synchronized application is associated with a package definition included in the configurable instructions, the package definition including synchronization parameters for only the synchronized application; and
    modifying the at least one synchronization parameter by applying the package definition to the at least one synchronization parameters of the data synchronization process in response to the synchronized application is associated with the package definition.

2. The method of claim 1, further comprising:
    establishing a default definition for the at least one synchronization parameter of the data synchronization process.

3. The method of claim 2, wherein applying the group definition includes overwriting the at least one synchronization parameter defined by the default definition.

4. The method of claim 1, wherein applying the package definition includes overwriting the at least one parameter defined by the default definition.

5. The method of claim 1, wherein applying the package definition includes overwriting at least one of the at least one parameter defined by the group definition included in the configurable instructions, the group definition including parameters for a group of synchronized applications associated with the central data store.

6. The method of claim 1, further comprising establishing a database schema for the central data store.

7. The method of claim 6, further generating the at least one parameter from at least the database schema.

8. The method of claim 6, further comprising establishing the configurable instructions based upon at least the database schema.

9. The method of claim 8, further comprising establishing the database schema and the configurable instructions in a platform-neutral format.

10. The method of claim 1, establishing the communication received from the synchronized application as including at least one environment associated with the synchronized application, and the at least one synchronization parameter is modified based upon the at least one environment associated with the synchronized application.

11. The method of claim 10, further comprising establishing the at least one environment as one of a geographical location associated with each of the data and a function associated with the synchronized application.

12. The method of claim 1, further comprising establishing the at least one parameter as one of a server address and a format associated with a data storage structure associated with a server included in the synchronized application.

13. The method of claim 1, further comprising:
sending the modified synchronization parameters from the central data store to the regional application, wherein the modified synchronization parameters are based at least in part on the updated data from the regional application; and
updating a regional data store having at least one regional server at the regional application with the modified synchronization parameters.

14. A system, comprising:
a non-transitory first data storage device including a plurality of first data servers, each of the first data servers including data associated with at least one of a plurality of data environments; and
a synchronized application including a non-transitory second data storage device in selective communication with the first data storage device, the second data storage device associated with a first one of the plurality of data environments and including a plurality of synchronized data servers, each synchronized data server including at least a subset of the data included in the first data storage device;
a regional application configured to communicate with the synchronized application;
wherein the first data storage device is configured to synchronize the at least a subset of the data stored in the first data storage device with the second data storage device according to at least one parameter defined by synchronizing instructions, the synchronizing instructions configured to define a default definition for the at least one synchronization parameter and be modified by the second data storage device by applying a group definition and then a package definition to the at least one parameter defined by the synchronizing instructions via a communication received from the second data storage device, wherein the group definition includes parameters for a group of synchronizing instructions associated with the first data storage device, wherein the package definition includes the at least one parameter and is associated with only the synchronized application, and further wherein the communication includes updated data received from the regional application.

15. The system of claim 14, wherein the first data storage device includes a database schema defining a plurality of synchronization parameters selectively included in the synchronizing instructions, and at least one of the synchronization parameters included in the synchronizing instructions is included in the database schema.

16. The system of claim 14, wherein the synchronizing instructions include the at least one group definition selectable by the communication received from the second data storage device, the group definition defining the at least one parameter and associated with the synchronized application and at least one other application in selective communication with the first data storage device, the other application associated with a second one of the plurality of data environments, the second one of the data environments being different from the first one of the plurality of data environments.

17. The system of claim 14, wherein the default definition defines at least one default parameter for the first data storage device to synchronize the data when the communication does not include the at least one default parameter.

18. The system of claim 14, wherein each of the data environments included in the plurality of data environments are assigned to only one of the first data servers, and to only one of the synchronized data servers.

19. The system of claim 14, wherein the communication includes the one of the plurality of data environments associated with the second data storage device.

20. The system of claim 19, wherein one of the plurality of data environments is one of a geographical location associated with one of the synchronized data servers and a function associated with the synchronized application.

21. The system of claim 14, further comprising establishing the at least one parameter as one of a server address and a format associated with a data storage structure associated with one of the synchronized data servers.

22. A non-transitory central data storage device, comprising:
a plurality of first data servers, each of the first data servers including data associated with at least one of a plurality of data environments;
wherein the plurality of first data servers are configured to selectively synchronize at least a subset of the data with a synchronized application, the synchronized application associated with a first one of the plurality of data environments and including a plurality of synchronized data servers, each synchronized data server including at least a subset of the data included in the plurality of first data servers; and
wherein the plurality of first data servers are configured to synchronize at least a subset of the data stored in the plurality of first data servers with the synchronized application according to at least one parameter defined by synchronizing instructions, the synchronizing instructions defining a default definition for the at least one synchronization parameter and configured to be modified by the synchronized application by applying a group definition and then a package definition to the at least one parameter defined by the synchronizing instructions via a communication received from the synchronized application, wherein the group definition includes parameters for a group of synchronizing instructions associated with the plurality of first data servers, wherein the package definition defines the at least one parameter and is associated with only the synchronized application, and further wherein the communication includes updated data received from a regional application distinct from the first data servers.

23. The central data storage device of claim 22, wherein the central data storage device includes a database schema defining a plurality of synchronization parameters selectively included in the synchronizing instructions, and at least one of the synchronization parameters included in the synchronizing instructions is included in the database schema.

24. The central data storage device of claim 22, wherein the synchronizing instructions include the at least one group definition selectable by the synchronized application, the group definition defining the at least one parameter and associated with the synchronized application and at least one other application in selective communication with the central data storage device, the other application associated with a second one of the plurality of data environments, the second one of the data environments being different from the first one of the plurality of data environments.

25. The central data storage device of claim 22, wherein the default definition defines at least one default parameter for the central data storage device to synchronize the data when the communication does not include the at least one default parameter.

* * * * *